Feb. 9, 1943.   R. J. BRANDT   2,310,509
LAMP ATTACHMENT
Filed Aug. 22, 1941   2 Sheets-Sheet 1
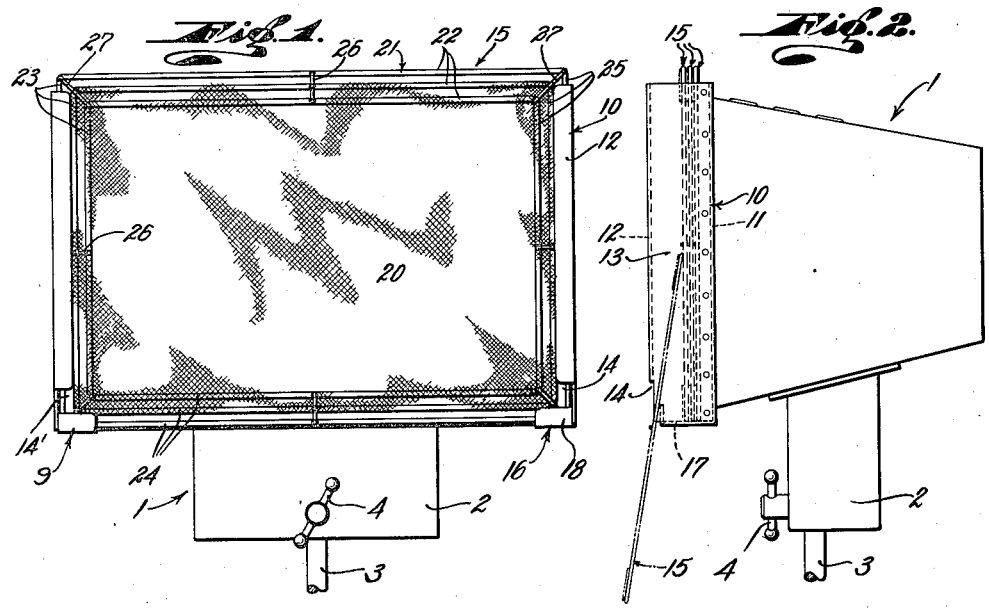
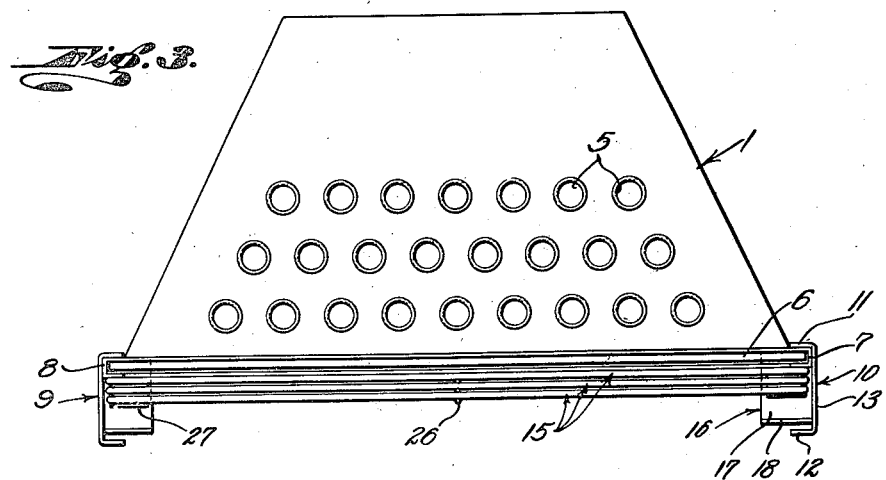
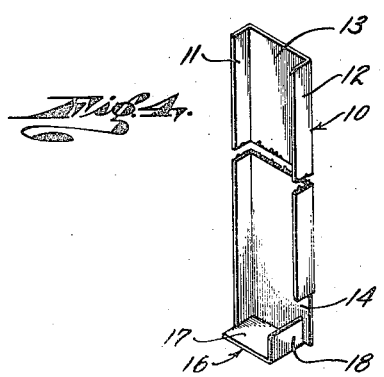
Inventor
Robert J. Brandt

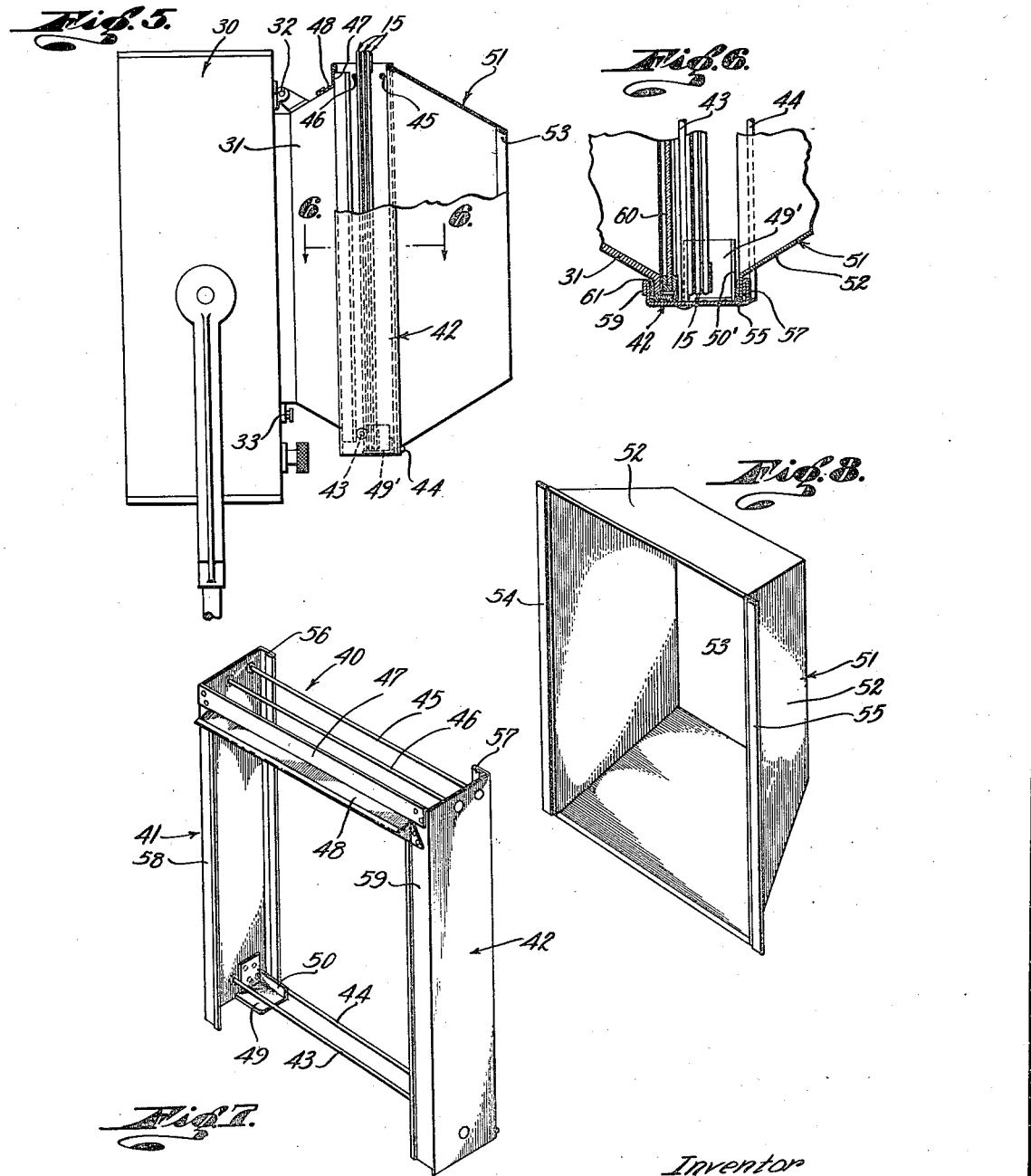

Patented Feb. 9, 1943

2,310,509

UNITED STATES PATENT OFFICE 2,310,509

LAMP ATTACHMENT

Robert J. Brandt, Los Angeles, Calif.

Application August 22, 1941, Serial No. 407,927

1 Claim. (Cl. 240—1.3)

The invention relates to a lamp attachment and in particular to an attachment for a lamp useful for motion picture photography.

When employing such lamps to illuminate the subject to be photographed, it is frequently desirable to vary the intensity and/or the diffusion, and/or the color of the light from such lamps, in order to obtain desired photographic effects. For this purpose it has heretofore been proposed to employ in front of the lamp one or more light filters which may be made of silk or other suitable material, held in a frame. Use of such filters as heretofore proposed, has been attended with two principal defects or objections, namely, (1) light leaks past the sides of the filter making it necessary to adjust a screen so as to prevent such leak light from getting into the camera, and (2) no convenient arrangement is provided for supporting the filters in front of the lamp. The result is that valuable time is lost, as highly paid artists on the set are kept idle while the attendant screens off the leak light and adjusts the filters for whatever number of lamps are employed.

An object of the invention is to overcome these defects, namely to provide a lamp attachment which will hold any desired large number of filters in front of the lamp in such a way as to prevent the necessity of separately using adjustable screens to block off leak light, the attachment itself serving as a support onto which the filters may be placed, and from which they may be removed readily without loss of valuable time.

Another object of the invention is to improve the construction of the filter frame so that a number of them may be stacked in a small space in front of the lamp, and so that each filter will be securely held by a frame which is rigid, although light in weight.

For further details of the invention, reference may be made to the drawings wherein Fig. 1 is a front elevation of a lamp attachment and filter frame according to the present invention, applied to a typical incandescent flood lamp.

Fig. 2 is a side elevation of the lamp attachment of Fig. 1, showing one of the filter frames partly removed.

Fig. 3 is a plan view looking down on top of the lamp attachment of Figs. 1 and 2.

Fig. 4 is an enlarged perspective view, with parts broken away, of one of the parts of the lamp attachment of Figs. 1 to 3.

Fig. 5 is a side elevation, partly in section, and with certain parts broken away, of a modified form of lamp attachment removably associated with another type of studio lamp.

Fig. 6 is an enlarged sectional view, with parts broken away, on line 6—6 of Fig. 5 looking in the direction of the arrows.

Fig. 7 is a perspective view of the lamp attachment and filter frame holder of Figs. 5 and 6.

Fig. 8 is a perspective view of a hood for the lamp attachment of Fig. 7.

Referring in detail to the drawings, I represents a conventional studio lamp having a base 2 which is adjustably supported on a post 3 by a locking handle 4. The top of lamp I, as shown in Fig. 3, is usually provided with a number of ventilating openings 5, and with a pane 6 of sand blasted glass or the like which serves as a diffuser. Glass 6 is supported in two channels 7 and 8 at each side of lamp I. In order to adapt such a lamp to readily accommodate a plurality of filters without leakage of light, I provide lamp I with two side wings 9 and 10 which serve both as light shields and filter holders. Wing 10 is shown in Fig. 4 and it comprises a metallic channel which is about as long as the front of the lamp is high, and having a back flange II and a front flange 12 which are bent at right angles to the main body 13 of the wing 10. The bottom of the front flange 12 has a cutaway portion as indicated at 14 to permit insertion of one or more of the filter frames 15. Either bent up from, or spot-welded to the body 13 of the wing 10 is an L shaped piece 16 having a horizontal portion 17 serving as a shelf on which the bottom of the filter frames 15 rest, and having a vertical portion 18 which serves as a stop to prevent the filter frames 15 from sliding out. The vertical portion 18 as shown in Fig. 4, is preferably set back behind the front edge of the main body portion 13, to make it easier to insert and remove the filter frames 15. The wing 9 at the other side of the lamp is similar to and a mirror image of the wing 10. The shelf piece 17 is made long enough to support any desired number of filter frames, and in the illustration in Fig. 3, it could support about six filter frames, although the wings 9 and 10 may be wider or narrower than as shown, to accommodate any desired number.

The filter frame 15 as shown in Fig. 2, is inserted into position in front of the lamp by inserting it into the opening 14 between the bottom of flange 12 and the top of flange 18, and into the corresponding opening 14' for the other wing 9, the filter frame 15 being pushed upwardly until the lower edge of the filter frame passes over the top of the flange 18 and the corresponding flange for wing 9, whereupon the filter frame 15 is dropped to rest on the body 17. Other filter frames may be inserted in like manner.

As shown in Fig. 1, the filter frame 15 may comprise a sheet 20 of silk or other material held by framework 21, each side of which comprises three parallel metal rods 22, the ends of which are cut at 45° to join with three similar rods 23 at the left side of the frame 21, and the latter in turns are cut at 45° and joined with three similar parallel rods 24 which comprise the bottom of the frame, and the latter are similarly cut at 45° to join three vertical rods 25 at the right side of the frame 21. Across the middle of each such set of three rods is brazed or spot-welded a cross or tie rod such as shown at 26, and at each corner, the adjoining ends of the respective rods are brazed together and on top thereof is brazed a cross or tie rod such as indicated at 27. The rods 22—25 are all in the same plane. The sheet 20 is preferably suitably secured over the center one of each of the three rods of the frame 21 whereby the outermost rod of the set is adapted to be grasped by the hand of the operator without contacting the sheet 20. The frame 21 as thus constructed, is rigid and light in weight and quite thin, three such filter frames 15 being shown stacked together in Figs. 2 and 3, whereby a large number of such filter frames 15 may be stacked in a comparatively narrow space.

In the modified form shown in Figs. 5 to 7, I illustrate a conventional lamp 30 of the arc type, having the usual removable hood 31 supported by a hinge 32 and secured by a lock 33. While the lamp attachment comprising the wings 9 and 10 of Figs. 1 to 4 is permanently secured to the lamp 1, although it could be removable, in Figs. 5 to 7 I illustrate the lamp attachment of my invention as being removable. As shown in Fig. 7, my lamp attachment comprises a frame 40 having two U shaped wings or side pieces 41, 42 which are held in spaced relation by spaced parallel rods 43, 44 at the bottom, spaced rods 45, 46 at the top, and by a cross piece 47 and a depending flange 48, the latter extending at the same angle as the flare of the top of hood 31 as shown in Fig. 5, the flange 48 serving to support the attachment 40 on the lamp 30. Rods 43 to 46, cross piece 47 and flange 48 are brazed at their ends to the side pieces 41, 42. Secured inside of the side pieces 41 and 42 is a pair of shelves, one of which is shown at 49 (Fig. 7), the latter having an upstanding flange 50 which extends parallel to and spaced behind the rod 44 as shown in Fig. 6, to provide a slot into which the upper edge of the filter frame 15 may be inserted, the top of the filter frame 15 being positioned between the rods 45 and 46, and the bottom thereof resting on the shelf 49, and on the companion shelf 49' on the bottom of the side member 42. Any desired number of filter frames 15 may be inserted in the filter frame holder 40, which may also serve to support a hood 51 shown in Fig. 8. The hood 51 has tapering sides as indicated at 52 to provide a restricted opening 53. Hood 51 has side flanges 54 and 55 which fit behind the flanges 56 and 57 on the side pieces 41 and 42, respectively, the bottom of hood 51 being supported by the rod 44 as indicated in Figs. 5 and 6.

The bottom of the filter frames 15 is prevented from sliding forward by the flanges 50, 50' and rod 43 prevents them from sliding backwards with respect to shelf 49 and the corresponding shelf on the side member 42. The side members 41 and 42 have flanges 58 and 59, respectively, which slide behind the straight vertical sides such as 61 of the hood 31 as shown in Fig. 6, to prevent light which passes through the conventional diffuser 60 and which is partially reflected by the filters 15 from being reflected around the sides of the hood 31, whereby there is no leakage of light around those sides. When the hood 51 is in place as shown in Fig. 5, the filter frames 15 may be inserted and removed from the top of the filter frame holder 40, between rods 45 and 46, although when hood 51 is removed, it is more convenient to insert and remove the filter frames 15 at the bottom of filter frame holder 40, between the rod 44 and the flanges 50, 50'.

It will be apparent that various modifications may be made in the invention without departing from the spirit of the following claim.

I claim:

A lamp attachment comprising a pair of U shaped side members of which one branch of the U is adapted to fit the sides of a lamp with the bottom of the U and the other branch thereof projecting in front of the lamp, a shelf on each of said side members for supporting the bottom of a filter frame, stop means for preventing the bottom of the filter frames from sliding off from said shelf, said side members being wide enough to accommodate a plurality of filter frames.

ROBERT J. BRANDT.